(12) United States Patent
Nakahara et al.

(10) Patent No.: US 11,479,129 B2
(45) Date of Patent: Oct. 25, 2022

(54) POWER SUPPLY DEVICE AND ELECTRIC VEHICLE PROVIDED WITH POWER SUPPLY DEVICE

(71) Applicant: SANYO Electric Co., Ltd., Daito (JP)

(72) Inventors: Chiharu Nakahara, Hyogo (JP); Masakazu Naito, Hyogo (JP); Yuusuke Okii, Osaka (JP)

(73) Assignee: SANYO Electric Co., Ltd., Daito (JP)

( * ) Notice: Subject to any disclaimer, the term of this patent is extended or adjusted under 35 U.S.C. 154(b) by 69 days.

(21) Appl. No.: 16/982,282

(22) PCT Filed: Nov. 16, 2018

(86) PCT No.: PCT/JP2018/042379
§ 371 (c)(1),
(2) Date: Sep. 18, 2020

(87) PCT Pub. No.: WO2019/187315
PCT Pub. Date: Oct. 3, 2019

(65) Prior Publication Data
US 2021/0016668 A1    Jan. 21, 2021

(30) Foreign Application Priority Data

Mar. 30, 2018   (JP) .............................. JP2018-069573

(51) Int. Cl.
*B60L 50/00*   (2019.01)
*B60L 50/64*   (2019.01)
(Continued)

(52) U.S. Cl.
CPC ......... *B60L 50/64* (2019.02); *H01M 10/0481* (2013.01); *H01M 10/613* (2015.04);
(Continued)

(58) Field of Classification Search
CPC ... B60L 50/64; H01M 10/613; H01M 10/647; H01M 10/648; H01M 10/654
See application file for complete search history.

(56) References Cited

U.S. PATENT DOCUMENTS 3,278,339 A * 10/1966 Reilly .................. H01M 50/30
                                                        429/82
4,060,670 A * 11/1977 Tamminen ............ H01M 50/10
                                                        429/154
(Continued)

FOREIGN PATENT DOCUMENTS

| JP | 2010-086887 A | 4/2010 |
| JP | 2011-171029 A | 9/2011 |
| JP | 2012-094456 A | 5/2012 |

OTHER PUBLICATIONS

International Search report dated Dec. 18, 2018, issued in counterpart Application No. PCT/JP2018/042379. (1 pages).

(Continued)

*Primary Examiner* — Hau V Phan
(74) *Attorney, Agent, or Firm* — WHDA, LLP (57) ABSTRACT

A pair of end plates are disposed at both end surfaces of a battery stack in which the plurality of battery cells are stacked, end plates are coupled to a bind bar, the battery stack is sandwiched between the end plates to be held, an elastic sheet that is elastically deformable in a thickness direction is disposed in a compressed state between the bind bar and a facing side surface of the battery stack, and the elastic sheet in the compressed state elastically holds the battery stack and the bind bar in a pressurized state.

10 Claims, 7 Drawing Sheets

(51) Int. Cl.
*H01M 10/613* (2014.01)
*H01M 10/625* (2014.01)
*H01M 10/6554* (2014.01)
*H01M 50/20* (2021.01)
*H01M 10/04* (2006.01)
*B60K 6/28* (2007.10)

(52) U.S. Cl.
CPC ..... *H01M 10/625* (2015.04); *H01M 10/6554* (2015.04); *H01M 50/20* (2021.01); *B60K 6/28* (2013.01); *B60Y 2200/91* (2013.01); *B60Y 2200/92* (2013.01); *B60Y 2400/112* (2013.01); *H01M 2220/20* (2013.01)

(56) References Cited

U.S. PATENT DOCUMENTS

| | | | | |
|---|---|---|---|---|
| 4,950,561 | A * | 8/1990 | Niksa | H01M 12/065 429/404 |
| 5,264,305 | A * | 11/1993 | Charkey | H01M 10/282 429/152 |
| 10,700,394 | B2 * | 6/2020 | Murata | H01M 10/6551 |
| 2003/0013007 | A1 * | 1/2003 | Kaun | H01M 10/045 429/94 |
| 2011/0024207 | A1 * | 2/2011 | Higashino | H01M 10/647 180/65.1 |
| 2011/0200862 | A1 | 8/2011 | Kurosawa | |
| 2012/0121961 | A1 * | 5/2012 | Hall | H01M 10/654 429/120 |
| 2014/0023906 | A1 | 1/2014 | Hashimoto et al. | |
| 2014/0266066 | A1 * | 9/2014 | Turon Teixidor | H01M 50/209 320/137 |
| 2014/0287291 | A1 * | 9/2014 | Miyawaki | H01M 10/6554 429/120 |
| 2015/0144409 | A1 | 5/2015 | Fujii | |
| 2015/0357617 | A1 * | 12/2015 | Okada | H01M 10/6557 429/120 |
| 2016/0036103 | A1 * | 2/2016 | Yamamoto | H01M 50/20 429/120 |
| 2017/0033336 | A1 * | 2/2017 | Hoshino | H01M 50/264 |
| 2017/0033339 | A1 * | 2/2017 | Watanabe | H01G 11/10 |
| 2017/0279094 | A1 * | 9/2017 | Ueda | H01M 10/482 |
| 2017/0358784 | A1 * | 12/2017 | Jeong | H01M 50/211 |
| 2017/0358785 | A1 * | 12/2017 | Hattori | B60L 58/21 |

OTHER PUBLICATIONS

Extended (Supplementary) European Search Report dated Mar. 23, 2021, issued in counterpart EP application No. 18911500.9. (9 pages).

* cited by examiner

POWER SUPPLY DEVICE AND ELECTRIC VEHICLE PROVIDED WITH POWER SUPPLY DEVICE

TECHNICAL FIELD

The present invention relates to a power supply device in which a plurality of battery cells are stacked, and an electric vehicle including the power supply device, such as a hybrid automobile, a fuel cell automobile, an electric automobile, and an electric motorcycle.

BACKGROUND ART

In a power supply device in which a plurality of battery cells are stacked to form a battery stack, end plates are disposed on both end surfaces of the battery stack, and the pair of end plates disposed on both ends are coupled by a bind bar. In this power supply device, the battery stack is fixed in a pressurized state by the pair of end plates, and the battery cells are stacked so as not to be displaced. Both end portions of the bind bar are coupled to the end plates so that the end plates press the battery stack from both the end surfaces. The bind bar is provided with bent pieces by bending both end portions of the battery stack inward, and the bent pieces are fixed to surfaces of the end plates by screwing. In the power supply device having this structure, the end plates are disposed on both side surfaces of the battery stack, and the bind bar is coupled to both sides of the end plates (see PTL 1).

In this power supply device, in order to fasten the prismatic battery cells in a stacked state, the prismatic battery cells are fixed by the bind bar that is an angle member. The bind bar has both ends fixed to the end plates disposed on both end surfaces of the prismatic battery cells in the stacked state. In particular, in order to prevent the prismatic battery cells from expanding due to repeated charging and discharging, it is necessary to firmly fasten the prismatic battery cells with the bind bar.

A power supply device in which a large number of battery cells are stacked needs to be forcibly cooled because the battery cells generate heat due to charging and discharging and a temperature rises. A power supply device has been developed in which a cooling plate is disposed on a lower surface of the battery stack to cool the battery stack (see PTL 2).

CITATION LIST

Patent Literature

PTL1: Unexamined Japanese Patent Publication No. 2010-86887
PTL2: Unexamined Japanese Patent Publication No. 2012-94456

SUMMARY OF THE INVENTION

Technical Problem

In the power supply device in which the cooling plate is disposed on the lower surface, it is important to thermally couple the cooling plate and the battery cells in a preferable state to efficiently cool each battery cell. In order to achieve this state, it is necessary to thermally couple the cooling plate to an entire width of a bottom surface of the battery stack without disposing the bind bar on the lower surface of the battery stack. Furthermore, not only in the power supply device in which the cooling plate is disposed, but also in the power supply device in which the battery stack is placed and held on a flat base plate, preferably, it is important that the bottom surface of the battery stack of the battery stack is exposed over the entire width. This is because if the bind bar locally holds both sides of the bottom surface of the battery stack, adverse effects such as deformation due to a pressure locally acting on bottom surfaces of the battery cells occur.

The present invention has been made in view of such conventional problems, and an object thereof is to provide a technique capable of reliably preventing displacement of battery cells while a bottom surface of a stacked battery stack is exposed over an entire width.

A power supply device according to an aspect of the present invention includes a battery stack where a plurality of battery cells are stacked, a pair of end plates that are disposed at both end portions of the battery stack, and a bind bar that extends in a stacking direction of the battery cells of the battery stack and has both end portions coupled to the end plates. The battery stack is a quadrangular prism extending in the stacking direction of the battery cells, and has four surrounding surfaces including an electrode surface where electrodes of the battery cells are disposed, a bottom surface on an opposite side of the electrode surface, and facing side surfaces where the bind bar is disposed. In the power supply device, an elastic sheet that is elastically deformable in a thickness direction is disposed in a compressed state between the bind bar and each of the facing side surfaces of the battery stack, and the elastic sheet in the compressed state elastically holds each of the facing side surfaces of the battery stack and an inner surface of the bind bar in a pressurized state.

Furthermore, an electric vehicle including the power supply device provided with components according to the above aspects includes the power supply device, a running motor supplied with electric power from the power supply device, a vehicle body including the power supply device and the running motor, and wheels that are driven by the running motor to run the vehicle body.

The above power supply device is characterized by being capable of reliably preventing displacement of the battery cells while the bottom surface of the stacked battery stack is exposed over an entire width. This is because, in the power supply device, the elastic sheet that is elastically deformable in the thickness direction is disposed in the compressed state between the bind bar and each of the facing side surfaces of the battery stack, and the elastic sheet in the compressed state elastically holds each of the facing side surfaces of the battery stack and the inner surface of the bind bar in the pressurized state. Furthermore, a structure that can prevent the displacement of the battery cells while the bottom surface of the battery stack is exposed over the entire width is characterized in that, for example, even in an assembly process until a base plate such as a cooling plate is disposed on a lower surface, the displacement of the battery cells can be prevented so that the power supply device can be efficiently manufactured.

DESCRIPTION OF EMBODIMENT

First, one point of interest of the present invention will be described. A power supply device exposes, over an entire width, a bottom surface of a battery stack in which a large number of battery cells are stacked while fastening both sides of the battery stack with a bind bar, and in a structure in which a cooling plate is disposed on a lower surface of the battery stack, the battery cells can be thermally coupled to the cooling plate in a preferable state to efficiently cool each battery cell. Furthermore, the present invention is not limited to the structure in which the cooling plate is disposed, and in a structure in which the battery stack is placed and held on a flat base plate, it is possible to stably support the battery stack without locally holding both sides of the bottom surface of the battery stack with the bind bar.

However, it is also important to fasten the battery stack with the bind bar to reliably prevent displacement of the battery cells. In particular, in a vehicle-mounted power supply device, a frequency of exposure to vibration and shock increases. Furthermore, in a heavy battery stack in which a large number of battery cells are stacked, there occurs an adverse effect that the larger a number of cells, that is, the longer the battery stack is, the more easily the battery cells are vertically vibrated due to vibration and the like, which causes the displacement. Furthermore, the battery stack is stacked with an insulating material sandwiched between adjacent battery cells, and if the battery cells are displaced and the insulating material is rubbed and damaged, there is a possibility that dielectric breakdown may occur, which may cause a large short battery to flow. Furthermore, there is a possibility that the battery cells may be displaced and physically damaged to cause adverse effects such as deteriorating electrical characteristics or shortening a life.

Fastening the battery cells with the bind bar so that the battery cells are strongly pressed makes it possible to reduce the displacement of the battery cells. However, with this structure, in addition to difficulty in reliably preventing the displacement, applying a strong pressure to the battery cells causes other adverse effects. For example, there occurs an adverse effect that the insulating material is deformed and an insulating state cannot be maintained, or an internal pressure of the battery cells rises and gas is ejected.

Furthermore, the battery cells are charged and discharged to generate heat. In particular, when a large current is discharged and charged, an amount of heat generated also increases. When a temperature of the battery cells becomes high, a battery life is shortened, and thus an efficient cooling structure is required. In such a cooling method, the battery stack is placed on the cooling plate, and the bottom surface of the battery stack is fixed to an upper surface of the cooling plate in a thermally coupled state. In such a structure, it is important to efficiently thermally couple the bottom surface of the battery stack and the cooling plate.

However, a conventional power supply device has a drawback that the bind bar limits a thermal coupling area between the cooling plate and the battery stack because the bind bar is disposed on a part of the bottom surface of the battery stack. A structure in which the bottom surface of the battery stack is thermally coupled to the cooling plate over the entire width is ideal as the cooling structure, but there is a drawback that it is difficult to hold the battery stack with the bind bar in a state where the battery stack is not displaced. Therefore, it is important to consider, as a structure for fastening both sides of the battery stack with the bind bar, a structure capable of reliably preventing the displacement of the battery cells while the bottom surface of the stacked battery stack is exposed over the entire width.

A power supply device according to an aspect of the present invention may be specified by the following configurations. The power supply device includes battery stack 2 where a plurality of battery cells 1 are stacked, a pair of end plates 3 that are disposed at both end portions of battery stack 2, and bind bar 4 that extends in a stacking direction of battery cells 1 of battery stack 2 and has both end portions coupled to end plates 3. Battery stack 2 is a quadrangular prism extending in the stacking direction of battery cells 1, and has four surrounding surfaces including electrode surface 2A where electrodes of battery cells 1 are disposed, bottom surface 2B on an opposite side of electrode surface 2A, and facing side surfaces 2C where bind bar 4 is disposed. In the power supply device, elastic sheet 6 that is elastically deformable in a thickness direction is disposed in a compressed state between bind bar 4 and each of facing side surfaces 2C of battery stack 2, and elastic sheet 6 in the compressed state elastically holds each of facing side surfaces 2C of battery stack 2 and an inner surface of bind bar 4 in a pressurized state.

Elastic sheet 6 may be a rubbery elastic sheet. Furthermore, elastic sheet 6 may be foamed rubber. This power supply device is characterized by being capable of more reliably preventing the displacement of the battery cells because the foamed rubber having a large frictional resistance is disposed between the battery stack and the bind bar.

Elastic sheet 6 may be a closed-cell foam. In this power supply device, since the elastic sheet is the closed-cell foam, even if dew condensation water generated in a state where external conditions such as a temperature and humidity are bad is absorbed by the elastic sheet, bubbles are independent. Thus, the water is not connected inside, so that insulation between the battery cells is secured. Furthermore, the closed-cell foam is characterized by being capable of increasing a pressure applied to the battery stack and the bind bar due to a cushioning effect of air contained inside, to increase the frictional resistance, and more reliably preventing the displacement of the battery cells with the large frictional resistance.

The power supply device may include cooling plate 7X that is disposed on bottom surface 2B of battery stack 2 and cools each of battery cells 1, and cooling plate 7X may be disposed in a thermally coupled state over an entire width of bottom surface 2B of battery stack 2. Since a thermal coupling area between the cooling plate and the battery stack can be increased, this power supply device is characterized by being capable of efficiently cooling the battery cells with the cooling plate. Furthermore, a contact area between the cooling plate and the battery cells is large, and the cooling plate does not locally support bottom surfaces of the battery cells, but supports entire surfaces in a wide area, so that a characteristic of preventing deformation and damage of the battery cells due to vibration or shock is achieved.

The power supply device may have a configuration in which bind bar 4 includes ridge 44 extending in the stacking direction of battery cells 1. In this power supply device, since a bending strength of the bind bar can be improved by the ridge provided on the bind bar, it is possible to inhibit the bind bar from spreading outward and reliably press the elastic sheet onto the battery cells. Therefore, even in a battery stack in which a large number of battery cells are stacked and that is long in the stacking direction, the elastic sheet can be reliably disposed in the pressurized state with respect to all the battery cells.

Furthermore, in the power supply device, bind bar 4 may be a metal plate, and the metal plate may be pressed to provide ridge 44. Furthermore, in the power supply device, bind bar 4 may include main body 40 that is disposed on each of facing side surfaces 2C of battery stack 2, and fixing pieces 41 that are coupled to both ends of main body 40 and fixed to end plates 3, and ridge 44 may be provided extending from main body 40 of bind bar 4 to fixing pieces 41.

Furthermore, in the power supply device, bind bar 4 may be a metal plate and include main body 40 that is disposed on each of facing side surfaces 2C of battery stack 2, fixing pieces 41 that are coupled to both ends of main body 40 and fixed to end plates 3, and corner plates 42 that are coupled to end edges of main body 40 and end edges of fixing pieces 41, each of corner plates 42 may include main body corner plate 42A of a metal plate continuous to a side edge of main body 40, and fixing corner plate 42B of a metal plate continuous to an end edge of corresponding one of fixing pieces 41, main body corner plate 42A may be bent at a boundary with main body 40 at right angle, fixing corner plate 42B may be bent at a boundary with the corresponding one of fixing pieces 41, and main body corner plate 42A and fixing corner plate 42B may be fixed and attached to each other in a stacked state, to be disposed in a position facing electrode surface 2A of battery stack 2.

The above power supply device is provided with the corner plates by effectively utilizing a part of the metal plate that is to be the bind bar, and corner portions of the main body and the fixing pieces are reinforced by the corner plates, so that bending strengths at boundaries between the main body and the fixing pieces can be improved. The fixing pieces coupled to the main body at the corner portions having strong bending strengths are characterized by being capable of being in close contact with and reliably fixed to outer surfaces of the end plates even in a state where a strong tensile force is applied.

Hereinafter, the present invention will be described in detail with reference to the drawings. Note that, in the following description, terms indicating a specific direction or position (for example, "upper", "lower", and other terms including those terms) are used as necessary, but use of these terms is for facilitating understanding of the invention with reference to the drawings, and the technical scope of the present invention is not limited by meanings of these terms. Furthermore, portions having the same reference numerals appearing in a plurality of drawings indicate the same or equivalent portions or members.

Moreover, an exemplary embodiment described below exemplifies a power supply device for embodying the technical idea of the present invention and an electric vehicle including the power supply device, and the present invention is not limited to the following. Furthermore, size, materials, and shapes of components, relative disposition between the components, and the like described below are not intended to limit the scope of the present invention thereto as long as there is no specific description, and are intended for exemplification. Furthermore, contents described in one exemplary embodiment and example can be applied to other exemplary embodiments and examples. Furthermore, the sizes and positional relationships of members illustrated in the drawings may be exaggerated in order to clarify description.

(Power Supply Device 100)

Figure 1:
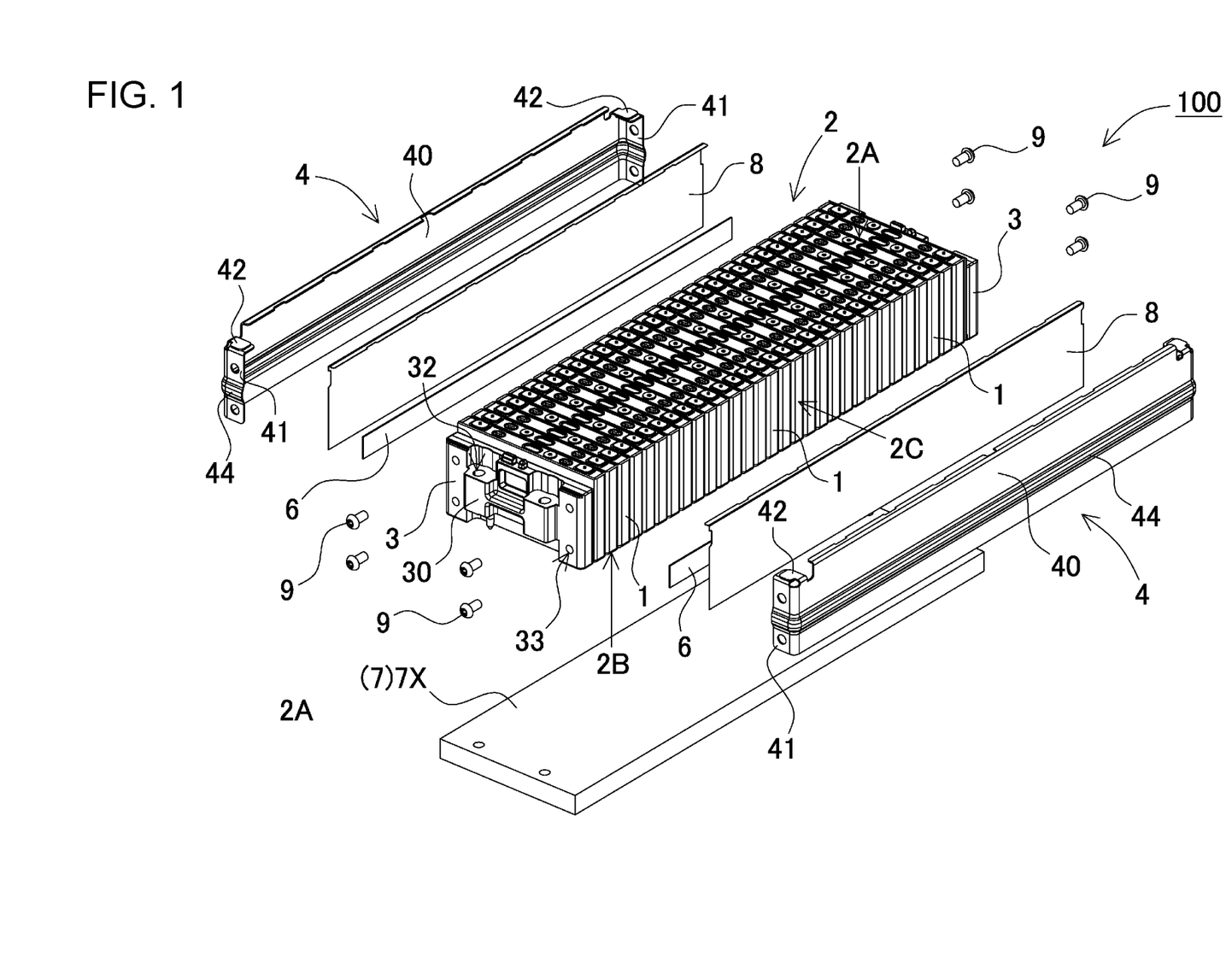
FIG. 1 is an exploded perspective view of a power supply device according to an exemplary embodiment of the present invention.
Figure 2:
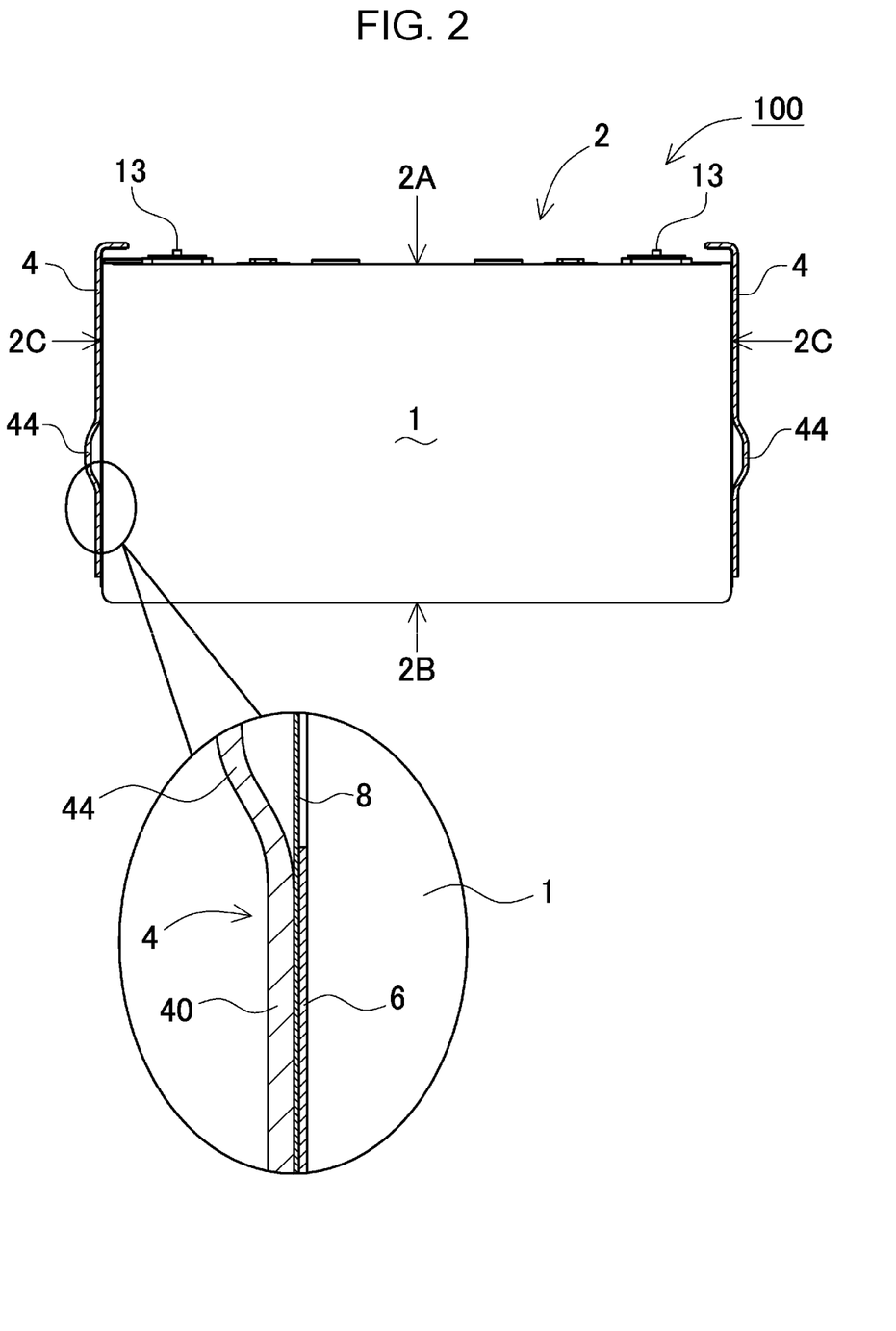
FIG. 2 is a partially enlarged vertical cross-sectional view of the power supply device according to the exemplary embodiment of the present invention.
Figure 3:
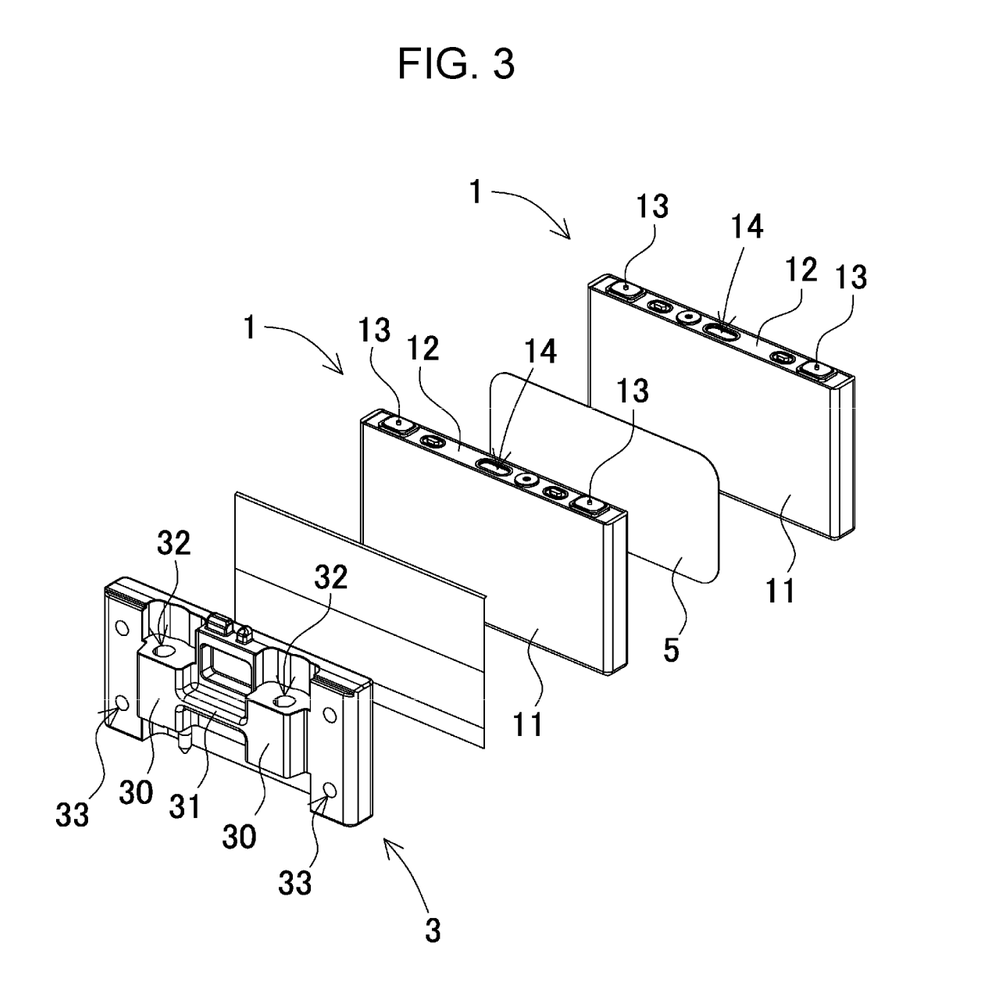
FIG. 3 is an exploded perspective view illustrating a stacked structure of battery cells of a battery stack illustrated in FIG. 1.

Power supply device 100 illustrated in FIGS. 1 to 3 includes a pair of end plates 3 that are disposed on both end surfaces in a stacking direction of battery stack 2 in which a plurality of battery cells 1 are stacked via insulating separators 5, bind bar 4 that is disposed on both side surfaces of battery stack 2 and has both ends coupled to end plates 3, elastic sheet 6 that is sandwiched in a gap between bind bar 4 and battery stack 2, and base plate 7 that is disposed on a bottom surface of battery stack 2. In power supply device 100, base plate 7 is cooling plate 7X. In power supply device 100, cooling plate 7X can be thermally coupled to each of battery cells 1 to cool battery cells 1 with cooling plate 7X. However, the power supply device of the present invention is not necessarily limited to a structure in which the cooling plate is disposed on the bottom surface of the battery stack, and the base plate may be a flat plate member on which the battery stack is placed and disposed in a fixed position.

(Battery Stack 2)

Battery stack 2 is a quadrangular prism in which the plurality of battery cells 1 are stacked and that extend in the stacking direction of battery cells 1. Battery stack 2 is a quadrangular prism having four surrounding surfaces consisting of electrode surface 2A on which electrodes of battery cells 1 are disposed, bottom surface 2B on an opposite side of electrode surface 2A, and facing side surfaces 2C on which bind bar 4 is disposed. As illustrated in FIG. 1, power supply device 100 is mainly used in a posture in which an upper surface of battery stack 2 is electrode surface 2A and a lower surface is bottom surface 2B, but can also be used in a posture vertically inverted or rotated 90 degrees.

(Battery Cell 1)

Battery cell 1 is a prismatic battery having an outer shape in which a thickness is smaller than a width. Battery cell 1 is a lithium ion secondary battery. However, as battery cell 1, all chargeable and dischargeable secondary batteries such as a nickel metal hydride secondary battery can be used instead of the lithium ion secondary battery. In particular, when the lithium ion secondary battery is used for battery cell 1, there is a feature that a charging capacity for a volume or mass of the entire secondary battery can be increased.

As illustrated in FIG. 3, battery cell 1 is provided with positive and negative electrode terminals 13 on sealing plate 12 that closes an opening of exterior can 11. Electrode terminals 13 are connected to positive and negative electrode bodies (not illustrated) built in exterior can 11. Exterior can 11 has a rectangular tubular shape with a bottom closed and facing surfaces being wide surfaces, and is open at a top in the figure. Exterior can 11 having this shape is manufactured by a metal plate such as aluminum or aluminum alloy being pressed. The opening of exterior can 11 is closed by laser welding with flat plate-shaped sealing plate 12 obtained by a metal plate being pressed.

Sealing plate 12 is provided with exhaust valve 14 between the pair of electrode terminals 13. Exhaust valve 14 is configured to be opened when an internal pressure of exterior can 11 rises to a predetermined value or higher, so that internal gas can be released. Opening exhaust valve 14 makes it possible to inhibit an increase in the internal pressure of exterior can 11. Exhaust valve 14 is preferably disposed substantially at a center of sealing plate 12 in a longitudinal direction. With this structure, even if adjacent battery cells 1 are stacked in a posture in which adjacent battery cells 1 are inverted in a width direction, exhaust valves 14 can always be aligned on the center of sealing plates 12.

(End Plate 3)

The pair of end plates 3 are disposed on both the end surfaces of battery stack 2 in which battery cells 1 and insulating separators 5 are alternately stacked, and battery stack 2 is fastened by the pair of end plates 3 in a pressurized state. Each of end plates 3 is made of a material exhibiting sufficient strength, for example, metal such as aluminum (in this specification, "aluminum" is used as a meaning including an aluminum alloy), and can have sufficient strength while being lightened. End plates 3 each has an outer shape substantially equal to an outer shape of battery cell 1 or slightly larger than the outer shape of battery cell 1, and fix the entire end surfaces of battery stack 2 in the pressurized state.

In power supply device 100, battery stack 2 is placed on base plate 7 and fixed in a fixed position. Each of end plates 3 is provided with fixing portion 30 for fixing battery stack 2 to base plate 7 on an outer surface. End plate 3 in FIG. 3 is provided with a pair of integrally-formed fixing portions 30 at positions that are apart from a lateral center toward both sides and are central parts in a vertical direction. Each of fixing portion 30 in FIG. 3 is block-shaped, and insertion hole 32 through which a bolt (not illustrated) to be fixed to base plate 7 is inserted is provided vertically penetrating fixing portion 30. Furthermore, in end plate 3 illustrated in the drawing, flange portion 31 coupling the pair of fixing portions 30 is integrally formed at a vertical central part of fixing portions 30. Flange portion 31 has a plate shape that extends in a width direction of end plate 3 and is located in a horizontal plane. Flange portion 31 serves as a handle when power supply device 100 is lifted or transported, or a locking portion of a lifting tool. Metal end plate 3 is manufactured by being cast in a shape having a structure in which the pair of fixing portions 30 and flange portion 31 are integrated, or the aluminum end plate is manufactured by casting or by molding with aluminum die casting. However, the end plate can also be manufactured by a metal plate being cut into a shape having the pair of fixing portions and the flange portion. Furthermore, the end plate may have a stacked structure of metal and plastic although the structure is not illustrated.

End plate 3 is provided with female screw holes 33 for bolting bind bar 4 on both side portions of the outer surface. End plate in FIG. 1 is provided with two female screw holes 33, because fixing pieces (=boards) 41 coupled to both ends of main body 40 of bind bar 4 is each fixed with two bolts 9. Female screw holes 33 are provided at fixing positions of bolts 9 so as to extend from the surface toward a back side.

(Bind Bar 4)

Bind bar 4 has a shape in which fixing pieces 41 each bent at a right angle are coupled to both end portions of main body 40 extending in the stacking direction of battery cells 1, and fixing pieces 41 are fixed to the outer surfaces of end plates 3 to fix battery stack 2 between the pair of end plates 3 in the pressurized state. Bind bar 4 couples the pair of end plates 3 by disposing main body 40 on facing side surface 2C of battery stack 2 and disposing fixing pieces 41 on the outer surfaces of end plates 3. Each of fixing pieces 41 is provided with bolt holes 43 through which bolts 9 to be screwed into female screw holes 33 of end plate 3 are inserted and that are opened at two upper and lower positions. Bind bar 4 has a predetermined thickness and is manufactured by a metal plate such as high-strength steel having a sufficient tensile strength being cut into a predetermined shape and then being bent.

Bind bar 4 illustrated in the exploded perspective view of FIG. 1 is provided with ridge 44 extending in the stacking direction of battery cells 1. Ridge 44 is provided by a metal plate being pressed. Bind bar 4 in the drawing is provided with ridge 44 extending continuously from main body 40 to fixing pieces 41. As illustrated in the cross-sectional view of FIG. 2, ridge 44 has a shape projecting outward and is provided in a middle part in a width direction.

Ridge 44 in the drawing has a cross-sectional shape that is curved with a predetermined radius of curvature. Bind bar 4 in the drawing is provided with one row of ridge 44 in the middle part, but it is also possible to provide a plurality of rows of ridges 44.

Bind bar 4 provided with ridge 44 projecting outward can widen a gap between battery stack 2 and bind bar 4 and sandwich thick elastic sheet 6 on an inner side of ridge 44. Thick elastic sheet 6 is sandwiched in the gap between battery stack 2 and bind bar 4 in a compressed state, and can press facing side surface 2C of battery stack 2 without difficulty while securing a predetermined pressure or more. Elastic sheet 6 described later is sandwiched between battery stack 2 and bind bar 4 and increases a frictional resistance between battery cells 1 and bind bar 4 to prevent the displacement of battery cells 1, particularly to prevent battery cells 1 from moving to a side of bottom surface 2B. In a structure in which thick elastic sheet 6 is disposed on the inner side of ridge 44, a pressing force between elastic sheet 6 and battery stack 2 and a pressing force between elastic sheet 6 and bind bar 4 are strengthened. Since the frictional resistance increases in proportion to the pressing force, a structure capable of strengthening the pressing force can increase the frictional resistance of elastic sheet 6 to effectively inhibit the displacement of each of battery cells 1.

Figure 4:
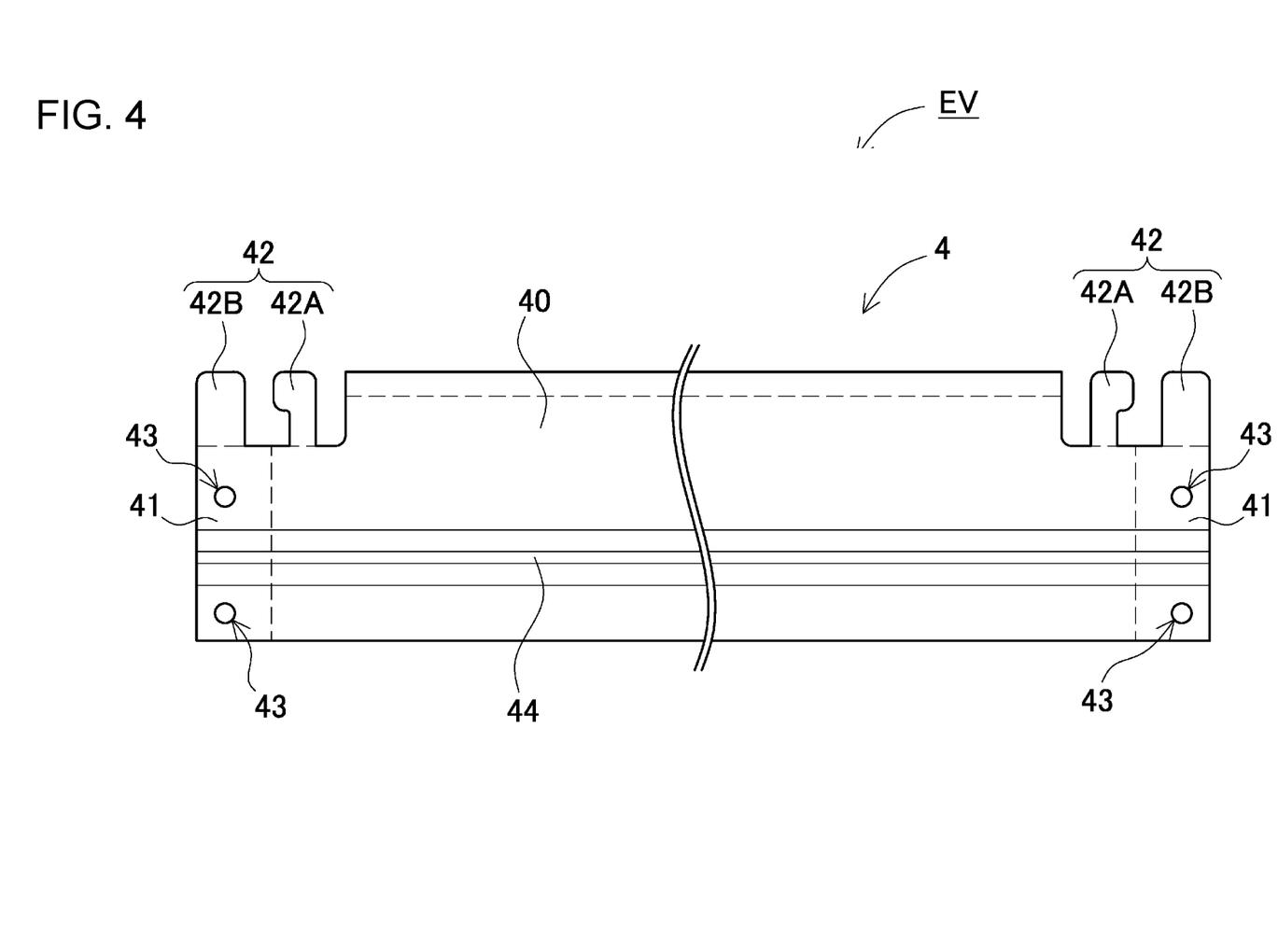
FIG. 4 is a development view of a bind bar of the power supply device illustrated in FIG. 1.
Figure 5:
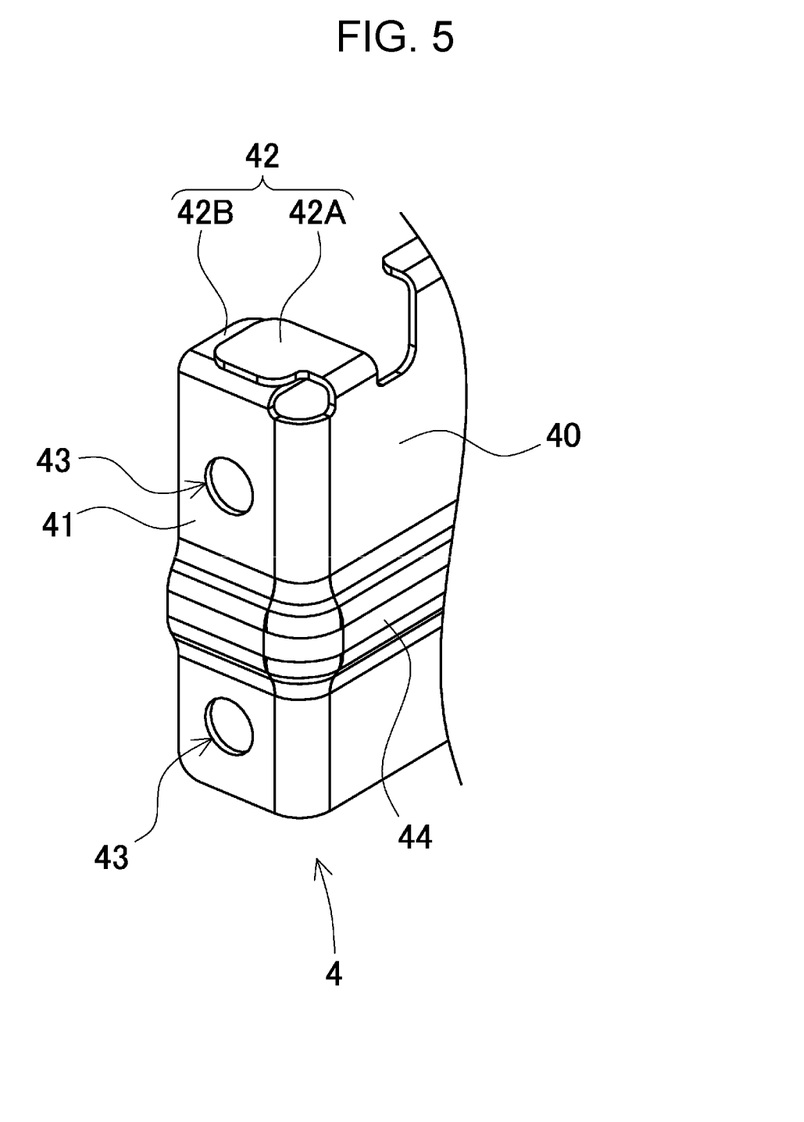
FIG. 5 is an enlarged perspective view of a main part of the bind bar of the power supply device illustrated in FIG. 1.

Furthermore, bind bar 4 is manufactured by a metal plate being cut into an outer shape in which main body 40 disposed on facing side surface 2C of battery stack 2, fixing pieces 41 coupled to both the ends of main body 40 and fixed to end plates 3, and corner plates 42 coupled to end edges of main body 40 and end edges of fixing pieces 41 are continuous. FIG. 4 is a plan view of the metal plate that is to be bind bar 4 developed in a plane. The metal plate that is to be bind bar 4 illustrated in this drawing has an outer shape in which fixing pieces 41 are coupled to both the end portions of main body 40 in a longitudinal direction, main body corner plates 42A are coupled to both the end portions of main body 40 in the longitudinal direction on one side (upper side in the drawing), and fixing corner plates 42B are each coupled to one end portion of corresponding one of fixing pieces 41 in a longitudinal direction. As illustrated in FIG. 5, a boundary between main body 40 and fixing piece 41 is bent at a right angle, a boundary between main body 40 and main body corner plate 42A is bent at a right angle, and a boundary between fixing piece 41 and fixing corner plate 42B is bent at a right angle, so that main body corner plate 42A and fixing corner plate 42B are disposed in a position where main body corner plate 42A and fixing corner plate 42B are stacked on each other. Main body corner plate 42A and fixing corner plate 42B are stacked on each other to be fixed and attached by a method such as welding to form corner plate 42. Corner plate 42 in which main body corner plate 42A and fixing corner plate 42B are stacked to be fixed and attached to each other has a sufficient strength with a two-layer stacked structure, and two orthogonal sides are coupled to main body 40 and fixing piece 41, so that fixing piece 41 is firmly coupled to main body 40, particularly with a strong bending strength. Since main body corner plate 42A and fixing corner plate 42B are provided in a process of cutting one metal plate, there is no need to use a dedicated metal plate, and bind bar 4 is reinforced while a material cost and a manufacturing cost are not increased.

Metal bind bar 4 is preferably insulated from battery stack 2 in a state of being disposed on facing side surface 2C of battery stack 2. In power supply device 100 illustrated in FIGS. 1 and 2, insulating sheet 8 is disposed between facing side surface 2C of battery stack 2 and bind bar 4 to insulate battery stack 2 and bind bar 4. Insulating sheet 8 is, for example, a sheet having a shape along an inner surface of main body 40 of bind bar 4, and is adhered to the inner surface of main body 40 to be disposed in a fixed position.

Bind bar 4 is fixed to end plates 3 to expose bottom surface 2B of battery stack 2 over the entire width. Therefore, main body 40 of bind bar 4 does not have a portion covering bottom surface 2B of battery stack 2, and is disposed only on a surface facing side surface 2C of battery stack 2. In power supply device 100, in a state where bind bar 4 is fixed to end plates 3 and the pair of end plates 3 hold battery stack 2 in a pressurized state, there is a risk that bind bar 4 cannot prevent downward displacement of battery cells 1, which may cause the displacement of battery cells 1. In this state, in order to prevent the displacement of battery cells 1, power supply device 100 in FIGS. 1 and 2 sandwiches elastic sheet 6 between facing side surface 2C of battery stack 2 and the inner surface of bind bar 4.

(Elastic Sheet 6)

Elastic sheet 6 is a sheet that can be elastically deformed in a thickness direction. Elastic sheet 6 that can be compressed in the thickness direction is a rubbery elastic sheet. The rubbery elastic sheet is foamed rubber or a synthetic resin foam. Since the foamed rubber has a large frictional resistance, the displacement of battery cells 1 can be prevented more effectively. The synthetic resin foam is characterized by being capable of being mass-produced at a low cost. Elastic sheet 6 made of a foam is characterized by being capable of controlling its elasticity by a foaming rate. As elastic sheet 6 made of the foam, a closed-cell foam is suitable. The closed-cell foam prevents passage of water because foamed bubbles are independent, and thus, even if water is generated near a surface of the elastic sheet, the water is not connected inside the elastic sheet, so that insulation between the battery cells is secured. For this reason, it is possible to prevent adverse effects caused by dew condensation water generated in an environment where external conditions such as a temperature and humidity are bad. Furthermore, the closed-cell foam is also characterized by being capable of using an air cushion formed by bubbles for a pressing force on battery stack 2 and bind bar 4.

Elastic sheet 6 is sandwiched in the gap between battery stack 2 and bind bar 4 in the compressed state, and is disposed in a state of pressing battery stack 2 and bind bar 4. Elastic sheet 6 sandwiched in the compressed state is thicker than the gap between battery stack 2 and bind bar 4, for example, thicker than 30% of the gap between battery stack 2 and bind bar 4, preferably thicker than 50% of the gap, and more preferably thicker than 80% of the gap. The gap between battery stack 2 and bind bar 4 is, for example, thicker than 0.3 mm, preferably thicker than 0.5 mm such that elastic sheet 6 is disposed in the compressed state and presses battery stack 2 and bind bar 4 at a predetermined pressure or more. Although a thickness of elastic sheet 6 is set in the above-described range in consideration of the gap between battery stack 2 and bind bar 4, the thickness also varies depending on an elastic modulus. Thus, the gap between battery stack 2 and bind bar 4 is considered, and the elastic modulus is also considered. Furthermore, since the displacement is influenced by a stacking pressure of stacked battery cells 1, the stacking pressure of battery cells 1 is also considered, so that an optimal thickness is set.

In a use state of power supply device 100, base plate 7 or the like is disposed on bottom surface 2B, so that base plate 7 prevents the downward displacement of battery cells 1. Meanwhile, in power supply device 100, it is necessary to prevent the displacement of battery cells 1 in an assembly process until base plate 7 is fixed. Power supply device 100 is configured such that elastic sheet 6 prevents the displacement of battery cells 1 until base plate 7 is fixed. Specifically, elastic sheet 6 held in the compressed state presses battery cells 1 and bind bar 4 with a sufficient pressing force in the assembly process, to reliably prevent the displacement of battery cells 1. Even if elastic sheet 6 is degraded with time and a compression force decreases, the displacement of battery cells 1 is prevented by base plate 7 in a state where base plate 7 is fixed. Thus, even if elastic sheet 6 is degraded, battery cells 1 are not displaced. Even if elastic sheet 6 is degraded and the pressing force decreases, the frictional resistance of elastic sheet 6 prevents the displacement of battery cells 1 as long as elastic sheet 6 presses battery stack 2 and bind bar 4. With base plate 7 fixed to bottom surface 2B, base plate 7 prevents the displacement of battery cells 1. In addition, even in a state where power supply device 100 is in use, battery cells 1 whose displacement is prevented by the frictional resistance of elastic sheet 6 are also characterized in that battery cells 1 are prevented from vibrating or being slightly displaced due to vibration or impact in the use state.

(Cooling Plate 7X)

Cooling plate 7X is fixed to bottom surface 2B of battery stack 2 in a thermally coupled state. Cooling plate 7X is fixed to fixing portions 30 of end plates 3. Cooling plate 7X is provided with a refrigerant passage (not illustrated) therein. Cooling plate 7X is cooled by circulating a refrigerant in the refrigerant passage. Cooling plate 7X, which circulates the refrigerant in the refrigerant passage, can be efficiently cooled. However, the cooling plate may have a structure in which radiating fins, which are not illustrated, are provided on a surface for cooling. A heat conductive paste is applied between cooling plate 7X and battery stack 2, or a heat conductive sheet is sandwiched between cooling plate 7X and battery stack 2 to establish a preferable thermally coupled state. Furthermore, in battery stack 2 having no insulating layer on bottom surface 2B, an insulating sheet is disposed between battery stack 2 and cooling plate 7X to insulate battery stack 2 and cooling plate 7X.

The above power supply device is optimal for a power supply device for a vehicle that supplies electric power to a motor that runs an electric vehicle. As the electric vehicle on which the power supply device is mounted, an electric vehicle such as a hybrid automobile or a plug-in hybrid automobile that runs with both an engine and the motor, or an electric automobile that runs only with the motor can be used, and the power supply device is used as a power source for these electric vehicles.

(Power Supply Device for Hybrid Vehicle)

FIG. 5 illustrates an example of mounting the power supply device on the hybrid vehicle that runs with both the engine and the motor. Vehicle HV on which the power supply device is mounted illustrated in this figure includes vehicle body 90, engine 96 and running motor 93 that run vehicle body 90, power supply device 100 that supplies electric power to motor 93, generator 94 that charges a battery of power supply device 100, and wheels 97 that are driven by motor 93 and engine 96 to run vehicle body 90. Power supply device 100 is connected to motor 93 and generator 94 via direct current (DC)/alternating current (AC) inverter 95. Vehicle HV runs with both motor 93 and engine 96 while charging and discharging the battery of power supply device 100. Motor 93 runs the vehicle by being driven in a region where engine efficiency is low, for example, during acceleration or low speed running. Motor 93 is driven by the electric power supplied from power supply device 100. Generator 94 is driven by engine 96 or regenerative braking when the vehicle is braked, to charge the battery of power supply device 100.

(Power Supply Device for Electric Automobile)

Figure 6:
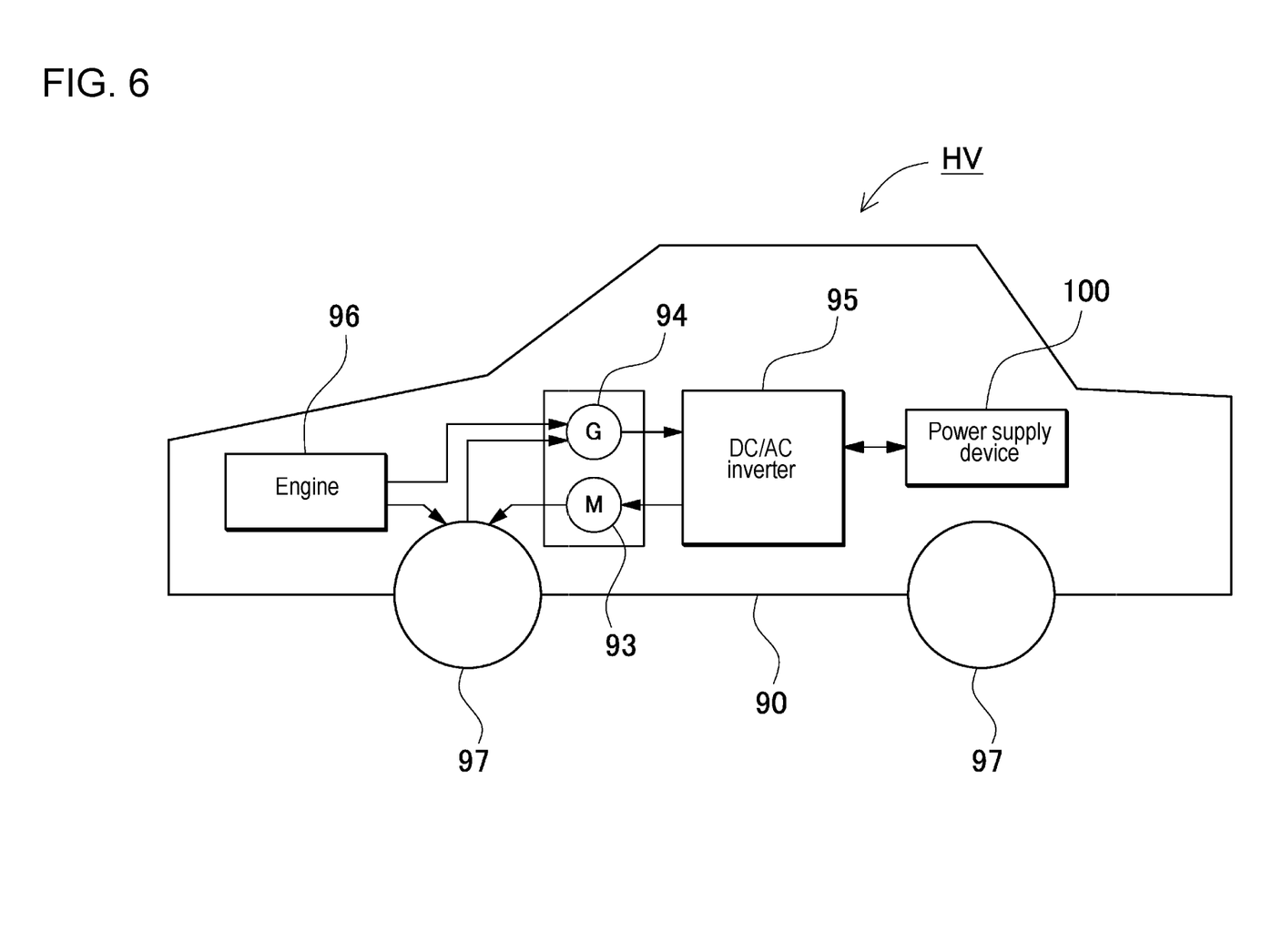
FIG. 6 is a block diagram illustrating an example of mounting the power supply device on a hybrid car that runs with an engine and a motor.
Figure 7:
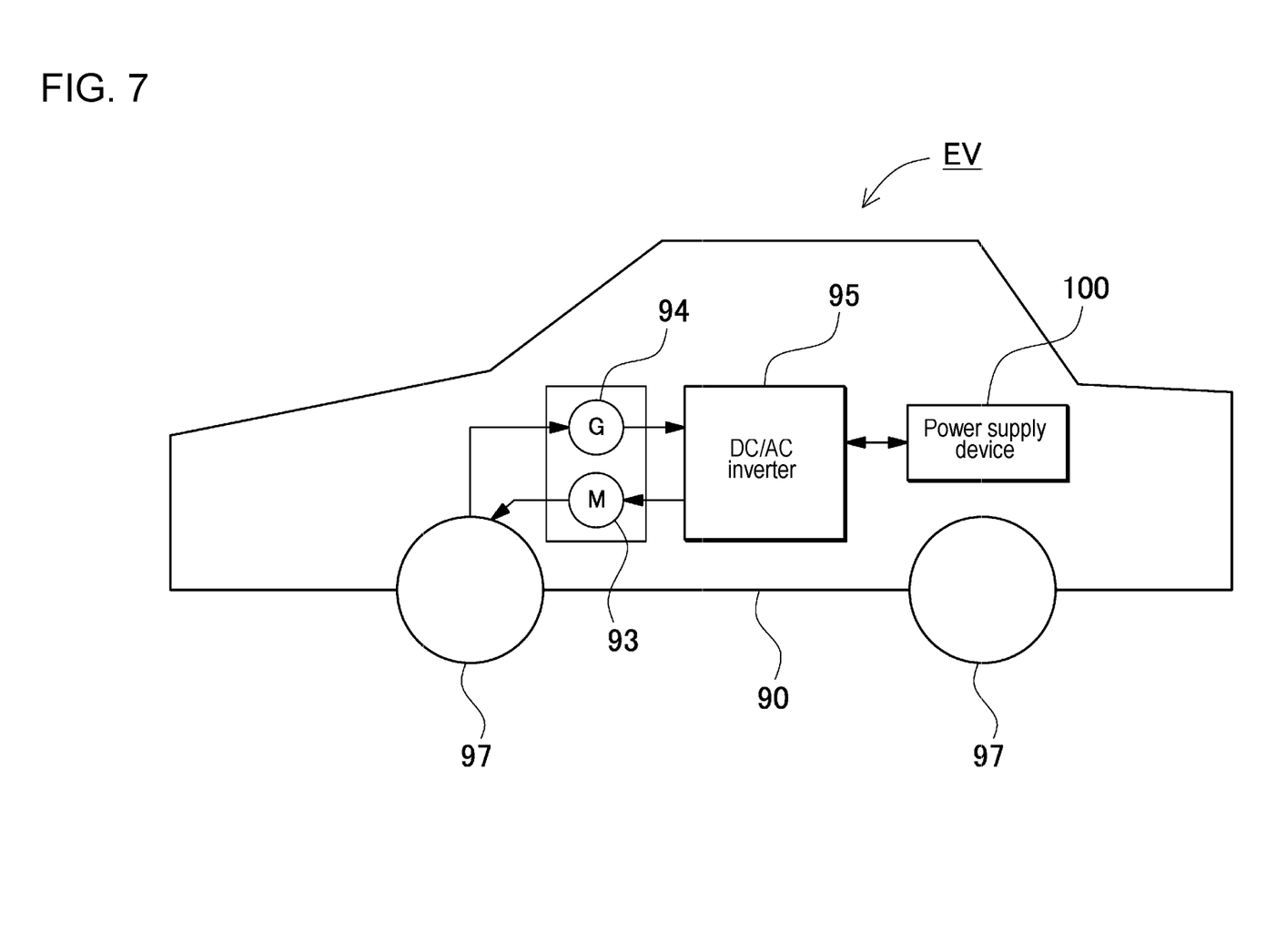
FIG. 7 is a block diagram illustrating an example of mounting the power supply device on an electric automobile that runs only with the motor.

Furthermore, FIG. 6 illustrates an example of mounting the power supply device on the electric automobile that runs only with the motor. Vehicle EV on which the power supply device is mounted illustrated in this figure includes vehicle body 90, running motor 93 that runs vehicle body 90, power supply device 100 that supplies electric power to motor 93, generator 94 that charges the battery of power supply device 100, and wheels 97 that are driven by motor 93 to run vehicle body 90. Motor 93 is driven by the electric power supplied from power supply device 100. Generator 94 is driven by an energy for regenerative braking of vehicle EV to charge the battery of power supply device 100.

INDUSTRIAL APPLICABILITY

A power supply device according to the present invention and a vehicle including the power supply device can be suitably used as a power supply device for a plug-in hybrid electric automobile and a hybrid electric automobile that can switch between an electric vehicle (EV) running mode and a hybrid electric vehicle (HEV) running mode, an electric automobile, and the like.

REFERENCE MARKS IN THE DRAWINGS

100: power supply device
1: battery cell
2: battery stack
2A: electrode surface
2B: bottom surface
2C: facing side surface
3: end plate
4: bind bar
5: insulating separator
6: elastic sheet
7: base plate
7X: cooling plate
8: insulating sheet
9: bolt
11: exterior can
12: sealing plate
13: electrode terminal
14: exhaust valve
30: fixing portion
31: flange portion
32: insertion hole
33: female screw hole
40: main body
41: fixing piece
42: corner plate
42A: main body corner plate
42B: fixing corner plate
43: bolt hole
44: ridge
90: vehicle body
93: motor
94: generator
95: DC/AC inverter
96: engine
97: wheel
HV: vehicle
EV: vehicle

The invention claimed is:

1. A power supply device comprising:
a battery stack including a plurality of battery cells that are stacked;
a pair of end plates that are disposed at both end portions of the battery stack; and
a bind bar that extends in a stacking direction of the plurality of battery cells of the battery stack and has both end portions coupled to the pair of end plates,
wherein the battery stack is a quadrangular prism extending in the stacking direction of the plurality of battery cells, and has four surrounding surfaces including an electrode surface where electrodes of the plurality of battery cells are disposed, a bottom surface on an opposite side of the electrode surface, and facing side surfaces on one of which the bind bar is disposed,
an elastic sheet that is elastically deformable in a thickness direction is disposed in a compressed state between the bind bar and the one of the facing side surfaces of the battery stack, and the elastic sheet in the compressed state elastically holds the one of the facing side surfaces of the battery stack and an inner surface of the bind bar in a pressurized state,
wherein a thickness of the elastic sheet in an uncompressed state is larger than a gap between the bind bar and the one of the facing side surfaces of the battery stack, such that the elastic sheet disposed in said gap remains in the compressed state, and
wherein an insulating sheet, separate from the elastic sheet, is disposed between the bind bar and the one of the facing side surfaces of the battery stack so as to insulate the battery stack and the bind bar, and
a thickness of the insulating sheet is smaller than the gap between the bind bar and the one of the facing side surfaces of the battery stack.

2. The power supply device according to claim 1, wherein the elastic sheet is a rubbery elastic sheet.

3. The power supply device according to claim 2, wherein the elastic sheet is foamed rubber.

4. The power supply device according to claim 1, wherein the elastic sheet is a closed-cell foam.

5. The power supply device according to claim 1, comprising a cooling plate that is disposed on the bottom surface of the battery stack and cools each of the plurality of battery cells,
wherein the cooling plate is disposed in a thermally coupled state over an entire width of the bottom surface of the battery stack.

6. The power supply device according to claim 1, wherein the bind bar includes a ridge extending in the stacking direction of the plurality of battery cells.

7. The power supply device according to claim 6, wherein the bind bar is a metal plate, and is pressed to provide the ridge.

8. The power supply device according to claim 6, wherein
the bind bar includes a main body that is disposed on the one of the facing side surfaces of the battery stack, and fixing pieces that are coupled to both ends of the main body and fixed to the pair of end plates, and
the ridge is provided extending from the main body of the bind bar to the fixing pieces.

9. The power supply device according to claim 1, wherein
the bind bar is a metal plate, and includes a main body that is disposed on the one of the facing side surfaces of the battery stack, fixing pieces that are coupled to both ends of the main body and fixed to the pair of end plates, and corner plates that are coupled to end edges of the main body and end edges of the fixing pieces,
each of the corner plates includes a main body corner plate of a metal plate continuous to a side edge of the main body, and a fixing corner plate of a metal plate continuous to an end edge of corresponding one of the fixing pieces, the main body corner plate is bent at a boundary with the main body at right angle, the fixing corner plate is bent at a boundary with the corresponding one of the fixing pieces at right angle, and the main body corner plate and the fixing corner plate are fixed and attached to each other in a stacked state, to be disposed in a position facing the electrode surface of the battery stack.

10. An electric vehicle comprising:
the power supply device according to claim 1;
a running motor that is supplied with electric power from the power supply device;
a vehicle body on which the power supply device and the running motor are mounted; and
wheels that are driven by the running motor to run the vehicle body.

* * * * *